United States Patent [19]
Agonafer et al.

[11] Patent Number: 5,644,687
[45] Date of Patent: Jul. 1, 1997

[54] METHODS AND SYSTEM FOR THERMAL ANALYSIS OF ELECTRONIC PACKAGES

[75] Inventors: Dereje Agonafer; Arnold Ojars Vimba, both of Poughkeepsie, N.Y.

[73] Assignee: International Business Machines Corporation, Armonk, N.Y.

[21] Appl. No.: 366,171

[22] Filed: Dec. 29, 1994

[51] Int. Cl.$^6$ ............................................. G06T 15/00
[52] U.S. Cl. ............................................. 395/119; 395/123
[58] Field of Search ............ 395/119–20, 123–24; 364/468, 474.22, 474.23, 474.24, 550, 551.01, 556–7, 578

[56] References Cited

U.S. PATENT DOCUMENTS

| | | | |
|---|---|---|---|
| 4,649,498 | 3/1987 | Kedem et al. | 395/120 |
| 4,811,237 | 3/1989 | Putatunda et al. | 364/491 |
| 4,890,242 | 12/1989 | Sinha et al. | 395/119 |
| 4,987,554 | 1/1991 | Kaufman | 395/124 |
| 5,014,230 | 5/1991 | Sinha et al. | 364/578 |
| 5,023,800 | 6/1991 | Carver et al. | 364/474.24 |
| 5,189,626 | 2/1993 | Colburn | 364/474.24 |
| 5,202,843 | 4/1993 | Kunimine et al. | 364/578 |
| 5,257,346 | 10/1993 | Hanson | 395/125 |
| 5,285,579 | 2/1994 | Armando | 33/18.1 |
| 5,293,321 | 3/1994 | Fujita et al. | 364/474.26 |
| 5,351,196 | 9/1994 | Sowar et al. | 364/474.24 |
| 5,506,947 | 4/1996 | Taubin | 395/123 |
| 5,537,519 | 7/1996 | Vossler et al. | 395/123 |
| 5,542,030 | 7/1996 | Gutfinger | 395/123 |

OTHER PUBLICATIONS

Chu, R.C. & Agonafer, D., "Computer–Aided Thermal Engineering For the Development of Future Electronic Cooling Systems," *Computers and Computing in Heat Transfer Science and Engineering*, 409–424.

Agonafer, D. & Vimba, A., 1991, "Solid Model (CATIA) Based Pre–Processor to CFD Code for Applications to Electronic Systems," ASME 91–WA/EEP, vol. 45.

Agonafer, D. & Kugel, L., 1992, "An Integrated (Electrical Mechanical) Design Methodology For Modeling of Electronic Cooling Systems," ASME92/EEP, vol. 3, 1–7.

*Primary Examiner*—Heather R. Herndon
*Assistant Examiner*—Rudolph Buchez
*Attorney, Agent, or Firm*—Lawrence D. Cutter; Heslin & Rothenberg PC

[57] ABSTRACT

A solid model of each part within an electronic package is created and assigned at least one non-geometrical property. For example, this may comprise automatically extracting information from a printed circuit board design tool and creating solid models of a printed circuit board and the parts thereon. Thereafter, each solid model is subdivided into multiple finite control volumes. A plurality of boundary conditions are automatically established for each of the multiple finite control volumes of each part using that part's non-geometrical property. Thermal analysis may then be performed on the electronic package using the boundary conditions for each finite control volume of each solid model of each part contained therewithin.

26 Claims, 3 Drawing Sheets

METHODS AND SYSTEM FOR THERMAL ANALYSIS OF ELECTRONIC PACKAGES

TECHNICAL FIELD

The present invention relates to thermal analysis of electronic packages. More particularly, the present invention relates to methods and a system for thermal analysis of electronic parts within an electronic package using finite control volume analysis.

BACKGROUND OF THE INVENTION

A typical electronic package may include, for example, a printed circuit board ("PCB") having various electronic parts disposed thereon. Specifically, these electronic parts may include active parts such as integrated circuit ("IC") chips, passive parts such as resistors and capacitors, and other parts such as connectors, mechanical fasteners, fans and switches. Thus, a broad array of electronic parts compose a typical electronic package.

The design of an electronic package including a PCB includes, for example, the design of the circuit interconnections and the layout of the parts on the PCB. Various considerations must be given to the parts layout such as, for example, the length and sizing of wiring between parts. Further placement considerations include thermal management of the PCB, typically cooling. Specifically, for example, the PCB is desirably laid out such that a coolant (e.g., a fluid or a gas) may flow around the parts on the PCB providing cooling thereof. Furthermore, it is desirable to space high-powered parts from each other such that excess heat is not developed in one localized section of the PCB.

The traditional approach to designing a PCB layout based upon thermal considerations involves manually estimating the proper layout of the board to minimize heat buildup and then manufacturing a corresponding prototype. The prototype is tested to confirm that thermal problems do not exist. Of course, if there are thermal problems, another prototype has to be designed and built, and the process is repeated. This could continue for many iterations, thus requiring the commensurate time and expense involved in designing and building multiple hardware prototypes. Furthermore, in many cases, the resulting design is still not optimal. Thus, the traditional approach to PCB layout based on thermal considerations is problematic.

In recent years, there has been a significant increase in the use of advanced techniques for solving electronic cooling problems. As one example, computational fluid dynamics ("CFD") has been used to analyze the thermal behavior of electronic packages and the electronic parts contained therein. More specifically, recent CFD techniques use finite control volume analysis wherein, for example, each electronic part is subdivided into multiple finite control volumes upon which CFD analysis is performed. This requires the assignment of boundary conditions and material properties to each of the finite control volumes.

As an example, an electronic part is broken up into multiple right parallelepiped shaped finite control volumes in a process called discretization. Each finite control volume is then assigned material properties and boundary conditions such that CFD analysis can be performed. The material properties may include, for example, power density and thermal conductivity. Boundary conditions are imposed for each surface of the finite control volume; in this example, for each of the six faces of each of the right parallelepiped shaped finite control volumes. Appropriate volumetric boundary conditions are also assigned as needed.

Specifically, boundary conditions may include, for example, solid-to-solid, fluid-to-fluid or solid-to-fluid boundary conditions. To explain, if a finite control volume is disposed completely internal to a solid part, each of its six boundary conditions will be solid-to-solid. Similarly, if a finite control volume is disposed completely within a fluid, then each of its boundary conditions will be fluid-to-fluid. However, if a finite control volume has one of its six surfaces coplanar with the outside surface of a solid part which is surrounded by a fluid, then that boundary condition is solid-to-fluid because it demarcs the interface between the solid part and the surrounding fluidic environment (coolant). Designation of these boundary conditions facilitates analysis by a finite control volume based CFD tool.

Up to this date, the assignment of material properties and boundary conditions to finite control volumes has been a tedious and difficult task. By way of example, the conventional process used for creating a finite control volume model of a part is summarized below.

Initially, a wireframe model is created representing only the geometry of the current part. The wireframe model is then subdivided into finite control volumes, each being absent in material property and boundary condition definitions. Thereafter, each finite control volume is manually assigned material properties and boundary conditions such that CFD analysis may be performed. It is important to note that more detailed analysis requires smaller, and therefore more, finite control volumes. Thus, as the detail of analysis required increases, there are more finite control volumes to have boundary conditions and material properties assigned thereto such that the task of assigning such information becomes prohibitive. Moreover, the problem is further compounded as the number of parts increase as with system level modelling.

The present invention is directed towards solving the above-noted problems.

SUMMARY OF THE INVENTION

In a first aspect, the present invention comprises a method for establishing a finite control volume model of a structure. The method includes creating a solid model of the structure which includes at least one non-geometrical property thereof. After the solid model has been created, it is subdivided into multiple finite control volumes. A plurality of boundary conditions are automatically established for each of the finite control volumes using the at least one non-geometrical property such that a finite control volume model of the structure is established.

As an enhancement, the structure may be disposed in a surrounding environment, and the method may include determining demarcation points between the structure and the surrounding environment so as to facilitate the automatic establishment of the boundary conditions. Further, both the structure and/or the surrounding environment may be discretized into multiple finite control volumes using the demarcation points.

In another aspect, the present invention comprises a method for thermally analyzing an electronic package which has multiple parts. The method includes creating a solid model of each part of the electronic package, and assigning at least one non-geometrical property to each solid model. Subsequently, each solid model is subdivided into multiple finite control volumes and a plurality of boundary conditions are automatically established for each finite control volume of each solid model using the at least one non-geometrical property thereof. Thermal analysis may then be performed on the electronic package using the plurality of boundary conditions for each finite control volume of each solid model of each part of the electronic package.

As an enhancement, creating the solid models may include processing a file containing at least one geometrical property and at least one non-geometrical property of each part. The file may be established, for example, from a printed circuit board definition.

The techniques of the present invention have numerous features and advantages associated therewith. Specifically, a designer can start with a printed circuit board design created with a standard PCB design tool, and have the relevant geometrical and non-geometrical information automatically transferred into a solid model-based CAD system, discretized, and analyzed by a CFD package. The process of discretization into finite control volumes, and assignment of boundary conditions and material properties is automated. Such techniques eliminate the previously required painstaking task of assigning material properties and boundary conditions to each finite control volume manually and individually. Using such traditional technology, the finite control volume model would have taken days to create, whereas using the integrated techniques of the present invention, the model is created in a matter of hours.

Other features of the present invention include the addition and deletion of component(s) without making any changes to the rest of the CFD model. Particularly, boundary conditions and other conditions already imposed on the components not effected by the change(s) will stay intact. This is possible because the conditions are object based, and not imposed on individual finite control volumes as previously done. Furthermore, the discretization grid is automatically realigned to accommodate the new geometry based upon the automatic location of demarcation points between objects.

BRIEF DESCRIPTION OF THE DRAWINGS

The subject matter which is regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

BEST MODE FOR CARRYING OUT THE INVENTION

The thermal analysis techniques of the present invention may be applied to, for example, thermal analysis of an electronic package which includes electronic parts on a PCB. Although described in relation thereto, the techniques described hereinbelow may be applied to thermal analysis of other packages, parts, devices and structures as will be apparent to one of ordinary skill in the art.

A typical printed circuit board design begins with, for example, the entry of a schematic into a printed circuit board design tool. The schematic defines, for example, the components and their interconnections, the component models and the PCB model. The printed circuit board design tool then performs automatic component placement and routing of wires based upon parameters including, for example, minimization of wire lengths. The output of the printed circuit board design tool includes photolithography files for manufacturing, and documents needed to assemble, the printed circuit board. One example of a PCB design tool is Allegro, manufactured by Cadence Systems, Inc., of San Jose, Calif.

To facilitate analysis according to the techniques of the present invention, geometrical and material information regarding the PCB and the parts thereon is transferred from the printed circuit board design tool to a solid model-based computer aided design ("CAD") system. Desirable features of a solid model-based CAD system include extensive design capabilities such as easy-to-use facilities to create geometries as well as numerical control capability. One example of a solid model-based CAD system is CATIA, which is a trademark of Dassault Systems, of Paris, France.

Further desirable features within the solid model-based CAD system include an open architecture such that users can extend or customize it for their specific needs. For example, in CATIA, customization may be performed using the graphics interactive interface ("GII"). The GII feature of CATIA may be used to develop a preprocessor to implement techniques of the present invention. One example of a CFD analysis utility written using GII may be found in "Solid Model (CATIA) Based Pre-Processor to CFD Code for Applications to Electronic Systems," ASME 91-WA/EEP - Vol. 45, by Agonafer, D. and Vimba, A., 1991, hereby incorporated by reference herein in its entirety.

Figure 1:
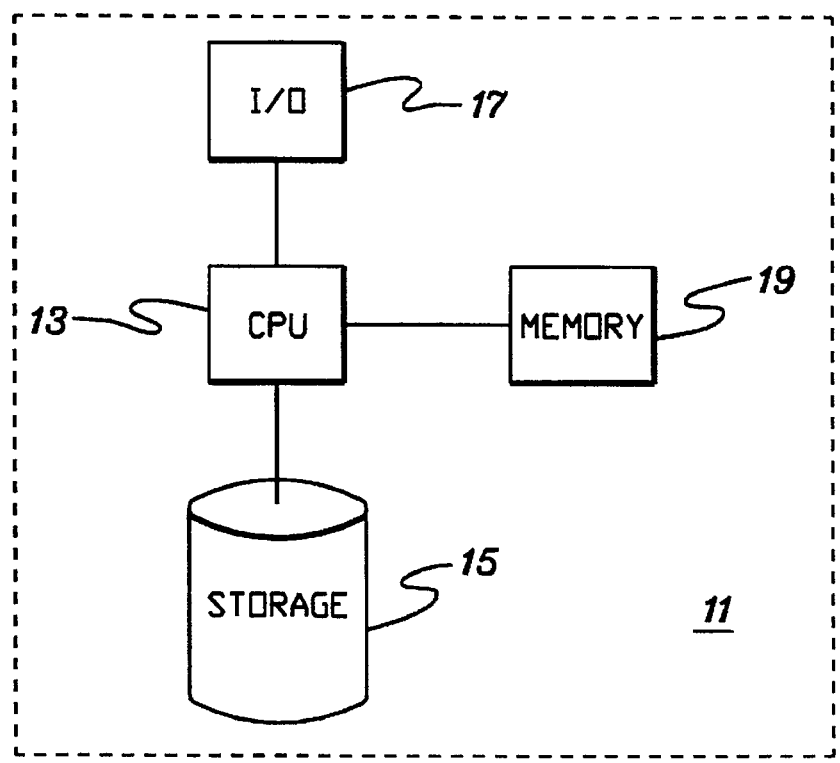
FIG. 1 is a block diagram of a computer system used to implement the techniques of the present invention.

The techniques of the present invention may be implemented using conventional computer technology. For example, a typical computer system is shown in FIG. 1. A computer system 11 includes a central processing unit ("CPU") 13, an input/output ("I/O") device 17, a memory 19 (e.g., random access memory) and storage 15 (e.g., disc or tape storage). A PCB design tool, solid model-based CAD system, finite control volume based CFD analysis system and associated utility programs may all be contained on a common computer system. For example, they may be contained in the computer system's storage 15 or memory 19 based upon application requirements, as will be apparent to one of ordinary skill in the art. Alternatively, the various tools and programs needed to implement the techniques of the present invention may be disposed on separate computer systems, with communications therebetween being achieved through I/O device 17. In either case, when programmed, the computer(s) constitutes a system for implementing the techniques of the present invention. Processing systems with the capabilities described hereinabove or equivalent may be used to implement the techniques of the present invention. For example, a typical computer system could comprise an International Business Machines RISC System/6000.

In the past, transferring information from printed circuit board design tools to solid model-based CAD systems has been limited to the transfer of only geometrical data. An example of a technique used to perform such a transfer is described in "An Integrated (Electrical/Mechanical Design Methodology for CFD Modelling of Electronic Cooling Systems," ASME 92—WA/EEP —Vol. 3, by Agonafer, D. and Kugel, L., hereby incorporated herein by reference in its entirety. However, according to the techniques of the present invention, not only are geometrical properties transferred to the solid model-based CAD system, but non-geometrical properties, such as material properties, are transferred as well. Specifically, a text file is either automatically or manually created and stored within the memory or storage of the computer system. This text file which contains geometrical information and non-geometrical (e.g. material) information for each part within the electronic package, including the printed circuit board itself. Thus, the solid model-based CAD system may create corresponding solid model objects upon importation and processing of the text file.

In an alternate embodiment of the present invention, the use of a text file to define the properties of the parts of the electronic package enables a user to create a solid-model definition of the electronic package without defining the parts using either a printed circuit board layout tool or a solid model-based CAD system. This is useful if a user is unfamiliar with how to enter parts using such tools or systems. For example, a user can create a text file which includes, for each part, geometrical property definition as well as material property definition. Thus, when the text file is imported using the solid model-based CAD system, the completed solid model-based design of the electronic package with associated properties is created. The solid model-based design of the electronic package is therefore established without the user having to enter individual object (part) information using either the PCB layout tool or even the solid model-based CAD system.

Figure 4:
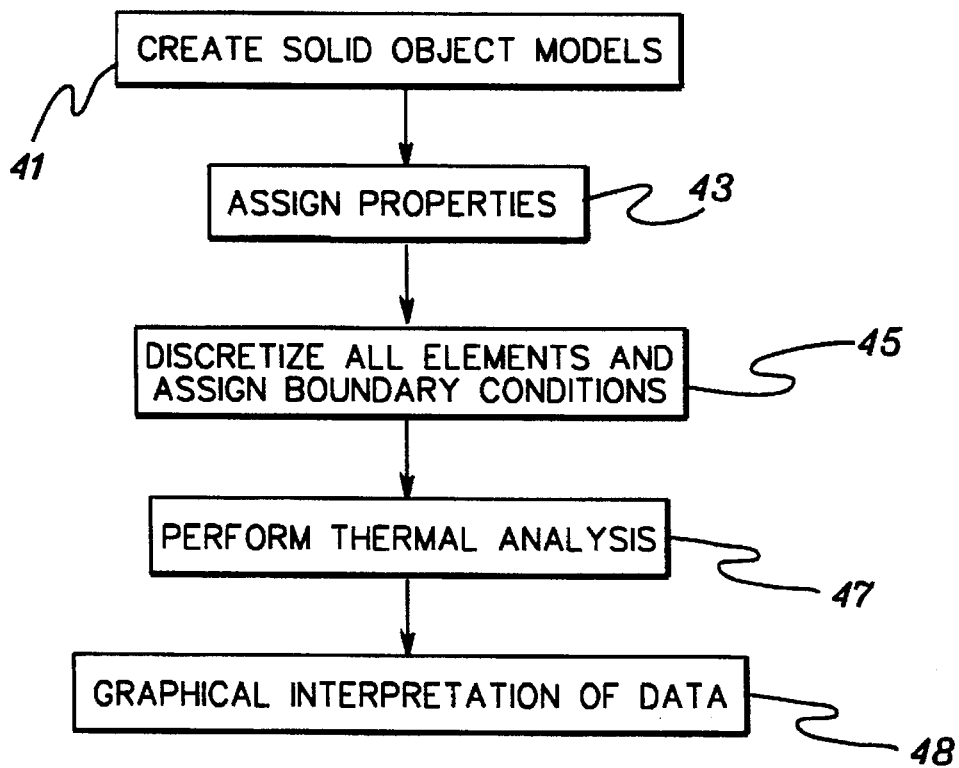
FIG. 4 is a flow diagram of a method for thermally analyzing an electronic package according to an embodiment of the present invention.

One method for implementing the techniques of the present invention is shown in the flow diagram of FIG. 4. An initial step includes the creation of solid object models (41) of each part within the electronic package. This includes active and passive parts as well as connectors, fans and other parts, such as the PCB. In one example, this may be performed by designing a PCB using a PCB layout tool, and then transferring the information stored with respect to the PCB to a solid model-based CAD system. Again, in accordance with the present invention, material properties are read into the solid model-based CAD system and stored in association with each object. As discussed hereinabove, these properties may be defined by manual creation of a text file that is imported into the solid model-based CAD system, or automatically defined by a utility program that creates the text file for importation. Alternatively, the circuit board layout may be designed on the solid model-based CAD system itself with the geometrical and material properties associated with each part being entered as each object (part) is defined therewithin. Thus, each object within the solid model-based CAD system can have both geometrical and material properties associated therewith (step 43).

In one method of transferring the material and geometrical properties to the solid model-based CAD system, the utility program which automatically generates the text file may comprise a conversion tool written to extract information from the PCB design tool and output the aforementioned text file. The text file is structured such that it may be read into the solid model-based CAD system by a macro function (e.g., written in GII). Within this text file each part may have, for example, two lines associated with it. The first line may contain geometrical properties of the part. The second line may contain material properties of the part. Material properties may comprise, for example, power density, thermal conductivity and material composition of the part. If these properties are known to the PCB design tool, then they may be extracted therefrom by the conversion tool. Alternatively, if these properties are not known, default values may be used by the conversion tool. As a programming example, if UNIX versions of Allegro and CATIA are used, the conversion tool may be programmed using a UNIX shell script. To note, the individual programming steps required to develop the conversion tool will be apparent to one of ordinary skill in the art based upon the foregoing discussions.

An additional method of assigning properties according to the techniques of the present invention includes the definition of material properties on an object (part) basis. As one example, objects may be grouped, and a common material property may be assigned to the entire group. Thereafter, the commonly assigned material property may be individually adjusted for individual objects. For example, if the electronic package includes multiple IC chips, a typical power density may be commonly assigned to all of the IC chips. Thereafter, special high-power chips such as processor chips may have their power density upwardly adjusted.

To continue, further steps in accordance with the techniques of the present invention include discretizing all objects into finite control volumes and assigning boundary conditions thereto (45—FIG. 4). In that regard, the printed circuit board and parts associated therewith, along with the surrounding coolant is considered the problem domain, hereinafter referred to as domain. Discretization can be performed simultaneously in all domain directions (e.g. x, y and z directions) or in one user defined direction at a time.

Figure 2:
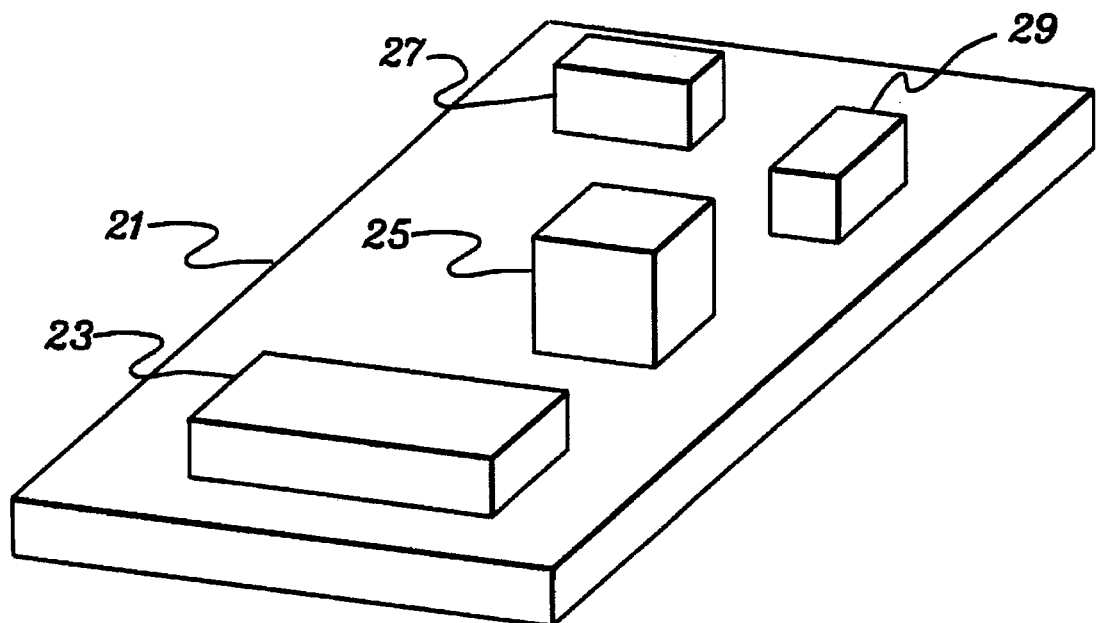
FIG. 2 is a perspective view of an electronic package including a printed circuit board and multiple electronic parts disposed thereon pursuant to an embodiment of the present invention.
Figure 3:
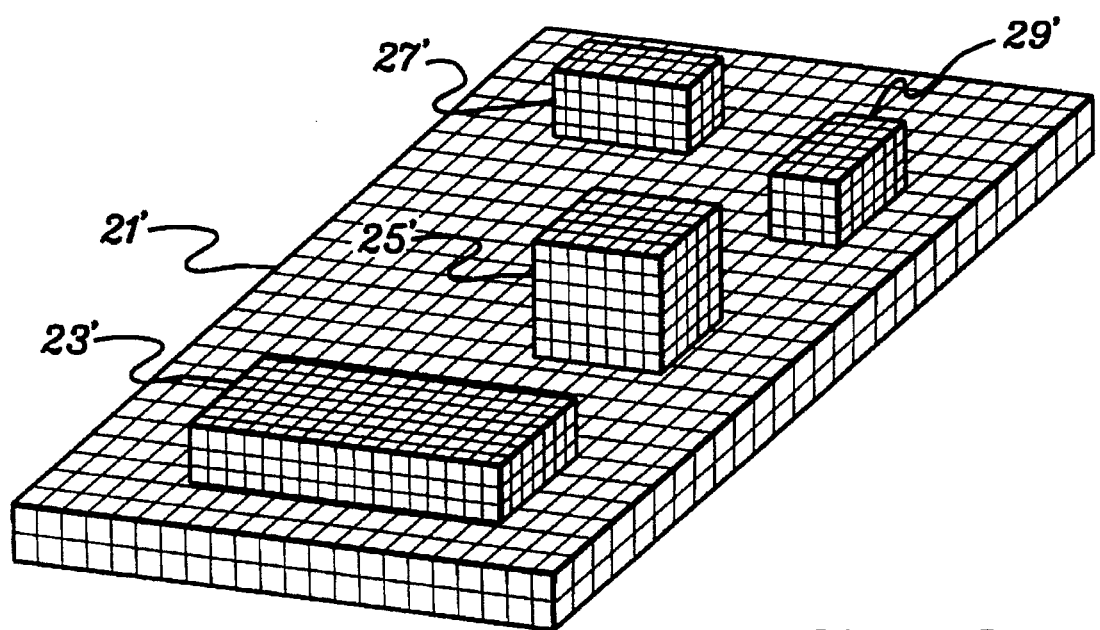
FIG. 3 is a perspective view of the electronic package of FIG. 2 subsequent to discretization thereof into finite control volumes in conformance with one embodiment of the present invention.

By way of example, an electronic package including a printed circuit board with multiple parts disposed thereon is shown in FIG. 2. The PCB 21 is represented as a first solid object. Further, multiple parts (23, 25, 27 and 29) are disposed on the printed circuit board and also are represented as corresponding solid objects. Surrounding the parts and the PCB is a coolant, for example, a fluid (not shown for purposes of clarity). This surrounding coolant is defined as a fluid object. After discretization, as shown in FIG. 3, each of the parts of the PCB as well as the PCB itself have been subdivided into finite control volumes. Also, although not shown for purposes of clarity, the surrounding coolant (e.g., fluid), has been discretized into finite control volumes as well. This facilitates proper modeling for purposes of finite control volume CFD analysis.

Figure 5:
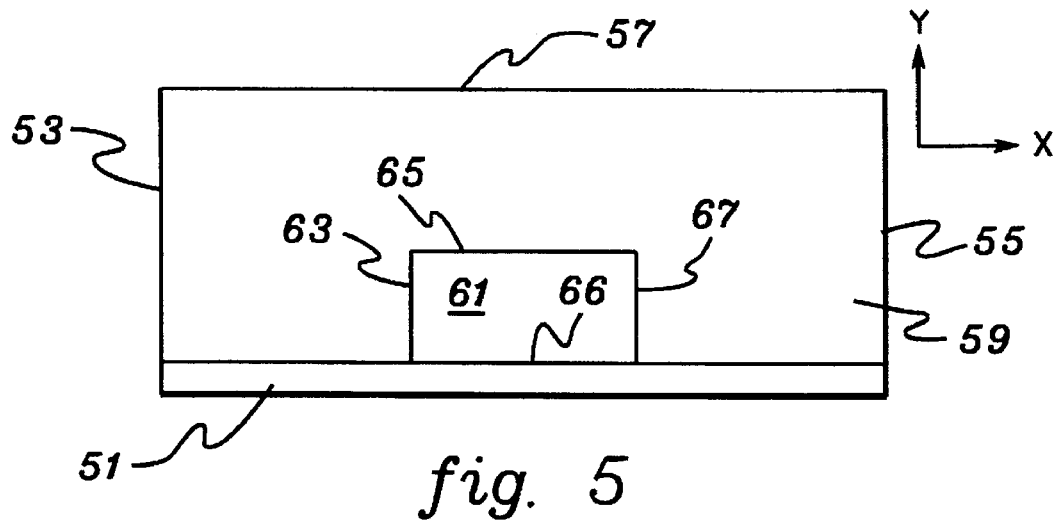
FIG. 5 is a schematic view of objects within a problem domain in accordance with an embodiment of the present invention.
Figure 6:
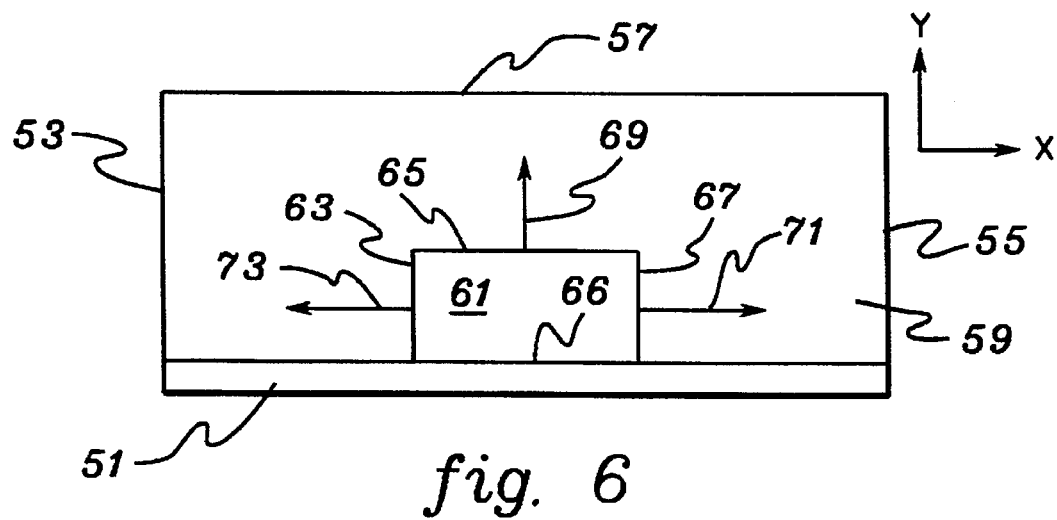
FIG. 6 is a schematic view of the problem domain of FIG. 5 with surface normals established for an object therewithin pursuant to one embodiment of the present invention.

To further explain, the discretization and boundary condition assignment techniques of the present invention are described in detail below with respect to FIGS. 5–7. A simplified example of a problem domain is shown in FIG. 5. Within the domain, an electronic part 61 is disposed on a PCB 51. The part 61 has west 63, east 67, north 65 and south 66 surfaces. Further included in the problem domain is top domain boundary 57, an inlet 53 and an outlet 55. A fluid 59 flows between the inlet and the outlet. For purposes of this example, only the X-Y plane is discussed. The application of these techniques to the Y-Z and X-Z planes will be apparent to one of ordinary skill in the art.

To continue, surface normals are established for each surface of object 61 (surface normals 73, 69 and 71) by techniques which will be apparent to one of ordinary skill in the art. These normals are then compared to the directions of the axis system for the problem domain. Specifically, for example, surface normals within an angular tolerance of the X-axis are identified. These would be surface normals corresponding to west 63 and east 67 surfaces, specifically normals 73 and 71, respectively. Thus, west surface 63 and east surface 67, which define the X-axis demarcations between fluid 59 and object 61 have been identified.

Identification of the solid-to-fluid demarcations within the X-axis facilitates the identification of discretization regions within the problem domain. Specifically, the plane defined by the demarcation surfaces of object 61 (surfaces 63 and 67) separate the problem domain into a first X-region 75, a second X-region 77 and a third X-region 79.

Next, the discretization regions within the problem domain are each discretized. Specifically, lines of discretization 81 are established within each discretization region of the problem domain such that the entire problem domain is subdivided. This is performed by dividing each of the discretization regions into a plurality of subdivisions. The individual steps needed to implement identifying the discretization regions and subdividing them will be apparent to one of ordinary skill in the art.

Figure 7:
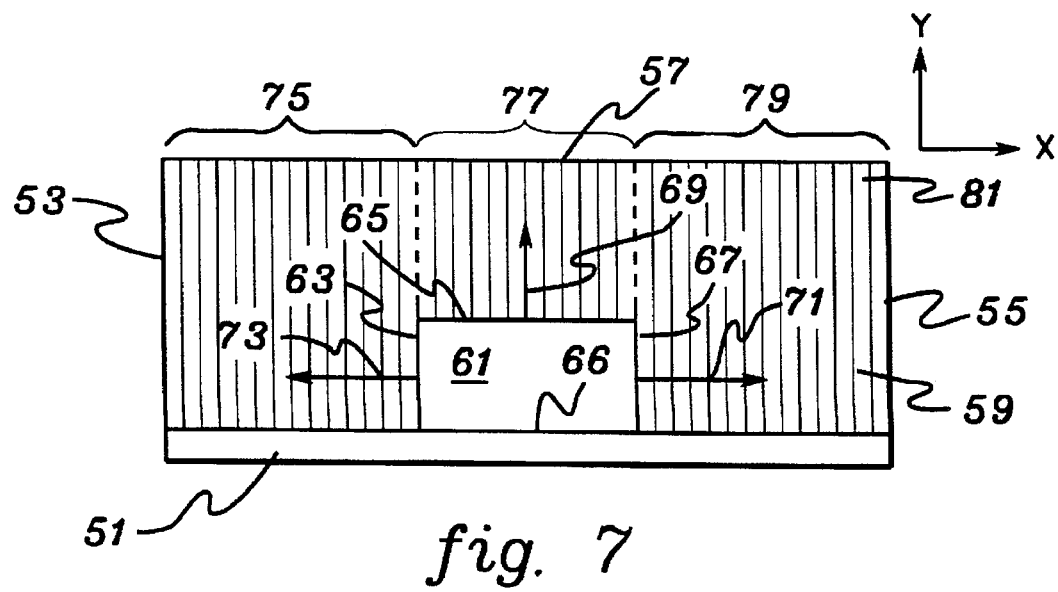
FIG. 7 is a schematic view of the problem domain of FIG. 6 after discretization along the X-axis in conformance with one embodiment of the present invention.

Although in the example of FIG. 7 the lines of discretization within each discretization region are uniformly spaced from each other, other spacings are possible. For example, logarithmic, exponential, linear gradient, central gradient and other spacing techniques are possible to enhance subsequent thermal analysis. To briefly explain, if more detailed information and analysis is required at demarcation points between fluids and solids, then, for example, an exponential distribution of discretization lines, with a closer spacing at regional boundaries would facilitate more detailed analysis at such boundaries. The above is accomplished in a user friendly solid model-based CAD environment with pop-up windows to facilitate desired changes.

Again, the techniques discussed hereinabove for discretizing in the X direction may be extended to the Y and Z directions as will be apparent to one of ordinary skill in the art. Accordingly, the intersection of the X, Y and Z discretization lines defines finite control volumes throughout the problem domain.

A next step according to the techniques of the present invention includes establishing boundary conditions for each finite control volume within the problem domain. As discussed above, X-axis, Y-axis and Z-axis discretization is performed to define finite control volumes. Due to the orthongonality of the axes to each other, finite control volumes are established having right parallelepiped shapes such that each finite control volume has six faces. In accordance with the techniques of the present invention, a boundary condition is automatically established for each of the six faces of each finite control volume. As a general note, the techniques of the present invention can be adapted to generalized curvolinear coordinate systems. Adapting the techniques thereto will be apparent to one of ordinary skill in the art.

Specifically, as discussed hereinabove, the demarcations between solids and fluids have already been established. Thus, as discretization is performed, either in all axes simultaneously or one axis at a time, boundary conditions may automatically be established for each finite control volume using the identified demarcations. For example, the boundary condition associated with a face of a finite control volume that is contiguous with the outer surface of object 61 is identified as a solid-to-fluid boundary condition. This identification is facilitated by the prior determination that the Subject object's surface separates the object from a surrounding fluid.

As other examples, finite control volume surfaces that are internal to an object, such as electronic part 61, have solid-to-solid boundary conditions associated therewith. In such a case, the boundary conditions will be similar, if not identical because the surfaces of the finite control volumes are within the same solid. Alternatively, for example, solid-to-solid boundary conditions may exist between dissimilar solids; for example, the boundary conditions of finite control volumes with surfaces on the southern surface 66 of object 61 which mate with PCB object 51. Prior identification of demarcations between the dissimilar solids (using the same techniques as the solid-to-fluid demarcation detection techniques discussed hereinabove) facilitate the identification of such boundary conditions. As a further example, finite control volumes disposed completely within fluid 59 contain fluid-to-fluid boundary conditions.

In addition to each finite control volume being defined, and boundary conditions associated therewith being determined, material properties for each finite control volume are established. More specifically, each object, for example, electronic part 61 has material properties associated therewith. Again, as discussed hereinabove, these properties are determined on an object basis within a solid model-based CAD system. Upon discretization of each object into finite control volumes, these properties are inherited by the finite control volumes that compose the object. Thus, the techniques of the present invention facilitate the automatic generation of finite control volumes having automatically defined material properties.

Subsequent to the automatic generation of finite control volumes with defined boundary conditions and material properties, thermal analysis thereof may be performed (step 47—FIG. 4). As discussed hereinabove, one type of thermal analysis is convective heat transfer analysis using finite control volume computational fluid dynamic techniques. Some capabilities of finite control volume computational fluid dynamics analysis packages include several turbulence models, multi-phase flow capability and an ability to tailor analysis programs to specific needs by modifying or supplying user specific subroutines. Advanced graphical analysis (48) is also available for the interpretation of data. An example of such a package is PHOENICS by CHAM, Ltd. of London, England. Use of such an analysis package, once finite control volumes with assigned boundary conditions and material properties have been supplied, will be apparent to one of ordinary skill in the art.

Thus, techniques of the present invention have been described which facilitate the automatic progression from printed circuit board layout to CFD thermal analysis. Such techniques have numerous advantages and features associated therewith.

Specifically, a designer can start with a printed circuit board design created with a standard PCB design tool, and have the relevant geometrical and non-geometrical information automatically transferred into a solid model-based CAD system, discretized, and analyzed by a CFD package. The process of discretization into finite control volumes, and assignment of boundary conditions and material properties is automated. Such techniques eliminate the previously required painstaking task of assigning material properties and boundary conditions to each finite control volume manually and individually. Using such traditional technology, the finite control volume model would have taken days to create whereas using the integrated techniques of the present invention, the model is created in a matter of hours.

The definition of material properties on a solid model object basis facilitates other advantages and features. In the past, an addition or deletion of an part would have necessitated a complete reentry of boundary conditions once discretization into finite control volumes was performed. According to the techniques of the present invention, if a part is added or deleted, the CFD model can be regenerated without requiring any other changes.

To explain, boundary conditions and other conditions already imposed on the components not effected by the change(s) will stay intact. This is possible because the conditions are object based, and not imposed on individual finite control volumes as previously done. Furthermore, upon discretization of the changed electronic package, the discretization grid is automatically realigned to accommodate the new geometry based upon the automatic location of demarcation points between objects.

To conclude, the integrated design techniques of the present invention facilitate the viability of thermal analysis at an earlier stage in the design of electronic packages. Thus, such techniques will greatly reduce lead time required for new products and improve the overall thermal management thereof.

While the invention has been described in detail herein, in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for establishing a finite control volume model of a structure, said method comprising the steps of:
   (a) creating a solid model of the structure, including assigning to the solid model at least one non-geometrical property of the structure;
   (b) subdividing said solid model into a first plurality of finite control volumes; and
   (c) automatically establishing a plurality of boundary conditions for each of said first plurality of finite control volumes using said at least one non-geometrical property of the structure such that the finite control volume model of the structure is established.

2. The method of claim 1, wherein said structure is disposed within a surrounding environment, said method further including the step of determining a plurality of demarcation points between said structure and said surrounding environment for facilitating said subdividing step (b) and said automatically establishing said plurality of boundary conditions step (c).

3. The method of claim 2, wherein said solid model includes a plurality of surfaces, said method further including determining a surface normal for each of said plurality of surfaces such that at least one surface of said plurality of surfaces is identified with a system axis for facilitating said step of determining said plurality of demarcation points between said structure and said surrounding environment.

4. The method of claim 2, wherein said subdividing step (b) further comprises discretizing said solid model into said first plurality of finite control volumes based upon said plurality of demarcation points between said structure and said surrounding environment.

5. The method of claim 4, wherein said method further includes discretizing said surrounding environment into a second plurality of finite control volumes based upon said demarcation points between said structure and said surrounding environment.

6. The method of claim 1, wherein said creating (a) includes assigning the at least one non-geometrical property of the structure to the solid model of the structure as a substantially homogeneous whole.

7. The method of claim 6, wherein the assigned at least one non-geometrical property comprises a material property of the structure as a substantially homogeneous whole.

8. The method of claim 1, wherein the assigned at least one non-geometrical property comprises a sub-surface material property of the structure.

9. A method for thermally analyzing an electronic package, said electronic package including multiple parts, said method comprising the steps of:
   (a) creating a solid model of each of said multiple parts of said electronic package to create a plurality of solid models;
   (b) assigning at least one non-geometrical property of each of said multiple parts to a corresponding solid model of said plurality of solid models;
   (c) after said step (b), subdividing each of said plurality of solid models into a plurality of finite control volumes;
   (d) automatically establishing a plurality of boundary conditions for each of said plurality of finite control volumes for each of said plurality of solid models using the at least one non-geometrical property of the solid model; and
   (e) thermally analyzing said electronic package using said plurality of boundary conditions for each finite control volume of each solid model of each part of the electronic package.

10. The method of claim 9, wherein said creating step (a) includes processing a file containing at least one geometrical property and containing said at least one non-geometrical property for each of said multiple parts.

11. The method of claim 10, wherein said file comprises a text file.

12. The method of claim 10, wherein said method further includes automatically generating said file from a printed circuit board design, said printed circuit board design being established by a printed circuit board design tool.

13. The method of claim 9, wherein said multiple parts includes a group of parts, and wherein said assigning step (b) further includes assigning a first non-geometrical property to each part of said group of parts.

14. The method of claim 13, wherein said assigning step (b) further includes adjusting the first non-geometrical property of a selected part of said group of parts.

15. The method of claim 9, wherein said creating step (a) comprises creating each of said plurality of solid models on a solid model-based computer aided design system, and wherein said assigning step (b) comprises assigning said at least one non-geometrical property of each of said multiple parts to said corresponding solid model of said plurality of solid models using said solid model-based computer aided design system.

16. The method of claim 9, wherein each of said plurality of solid models has multiple surfaces, each of said multiple surfaces defining a demarcation between a solid model and another model, and wherein said automatically establishing step (d) comprises automatically establishing said plurality of boundary conditions for each of said plurality of finite control volumes for each of said plurality of solid models using said demarcations.

17. The method of claim 16, wherein said demarcations include one of a solid-to-solid demarcation, a solid-to-fluid demarcation and a fluid-to-fluid demarcation.

18. The method of claim 9, wherein said at least one non-geometrical property includes one of power density, material composition and thermal conductivity.

19. The method of claim 9, wherein said assigning (b) includes assigning the at least one non-geometrical property of each of said multiple parts to the corresponding solid model of the corresponding part as a substantially homogeneous whole.

20. The method of claim 19, wherein the assigned at least one non-geometrical property of each of said multiple parts comprises a material property of the corresponding part as a substantially homogeneous whole.

21. The method of claim 9, wherein the assigned at least one non-geometrical property of each of said multiple parts comprises a sub-surface material property of the corresponding part.

22. A system for thermally analyzing an electronic package comprising a first plurality of parts, said system comprising:

a plurality of solid models, wherein at least one of said plurality of solid models represents its corresponding part of said first plurality of parts of said electronic package, said at least one of said plurality of solid models having at least one non-geometrical property of its corresponding part assigned thereto;

means for subdividing each of said plurality of solid models into a plurality of finite control volumes;

means for automatically establishing a plurality of boundary conditions for each of said plurality of finite control volumes using the at least one non-geometrical property of the at least one solid model; and means for thermally analyzing said electronic package using said plurality of boundary conditions for each finite control volume of the electronic package.

23. The system of claim 22, wherein said system comprises a programmed computer, and wherein said plurality of solid models are objects within a memory of said programmed computer.

24. The system of claim 22, wherein the at least one of said plurality of solid models has assigned thereto at least one non-geometrical property of its corresponding part as a substantially homogeneous whole.

25. The system of claim 24, wherein the assigned at least one non-geometrical property of each of said first plurality of corresponding parts comprises a material property of the corresponding part as a substantially homogeneous whole.

26. The system of claim 22, wherein the assigned at least one non-geometrical property of each of said first plurality of corresponding parts comprises a sub-surface material property of the corresponding part.

* * * * *